United States Patent [19]
Murolo

[11] 4,001,458
[45] Jan. 4, 1977

[54] FRESH LEMON-FLAVORED ALCOHOL BEVERAGE AND METHOD OF PREPARATION

[75] Inventor: Giuseppe Murolo, New York, N.Y.

[73] Assignees: Sabastiano Monte; Anya Rejnarowycz; Giuseppe Murolo, all of New York, N.Y.

[22] Filed: Nov. 6, 1975

[21] Appl. No.: 629,589

[52] U.S. Cl. .............................. 426/592; 426/429; 426/616; 426/651
[51] Int. Cl.² ........................................ C12G 3/06
[58] Field of Search .......... 426/531, 592, 616, 651, 426/429

[56] References Cited
UNITED STATES PATENTS 1,750,768   3/1930   Aronson et al. ............... 426/651 X

OTHER PUBLICATIONS

Merory, *Food Flavorings–Composition, Manufacture and Use*, The AVI Publishing Co., Inc. (1968), pp. 372, 387, 388.
*Old Mr. Boston Deluxe Official Bartender's Guide*, (1963), pp. 12, 117, 125.

*Primary Examiner*—A. Louis Monacell
*Assistant Examiner*—Esther L. Massung

[57] ABSTRACT

A concentrate for fresh lemon-flavored alcohol beverages comprises alcohol and from 0.5 to 10 percent lemon, in the form of lemon peel or lemon oil, is prepared by mixing the lemon and alcohol, and thereafter permitting these ingredients to stand at ambient temperature and form a concentrate solution. Suitable quantities of water and sugar may be added to control the percent alcohol and dryness, respectively, of the beverage.

1 Claim, No Drawings

FRESH LEMON-FLAVORED ALCOHOL BEVERAGE AND METHOD OF PREPARATION

The present invention relates to novel compositions and a method for preparing these compositions. More particularly, this invention relates to alcoholic beverage concentrates, and beverages made from such concentrates, having a lemon flavor. An important feature of the invention is the method for preparing these concentrates and beverages, whereby the final beverage product has an improved flavor, color, and aroma, and a most satisfactory shelf life of extended duration.

Great difficulty had been experienced in the past in the preparation of alcoholic beverages, including liqueurs and aperitifs, having a fresh lemon flavor which did not spoil over any reasonable shelf-life period. The difficulty stemmed from the inability to combine alcohol and lemon ingredients, in proper proportions and without the addition of chemical preservatives, to achieve a reasonable shelf life for commercial production and sale, and while still maintaining a truly fresh lemon flavor and taste. Although great effort has been expanded in attempts to prepare such alcohol concentrates and beverages having a lemon flavor, chemical preservatives have been a necessity in a fresh lemon-flavor alcohol beverage composition havng a shelf life of over a year or longer. Such a beverage made solely from natural ingredients was heretofore unknown.

I have now surprisingly found, according to the present invention, that an alcoholic lemon concentrate may be prepared having a satisfactory shelf life by combining distilled alcohol, 200 proof, with from about 0.5 percent to about 10 percent yellow lemon peels. In preparing beverages from such a concentrate, a suitable amount of water may be added to obtain the desired percent alcohol, or proof. However, I have found that where the proof is less than about 20–25, the nature of the beverage deteriorates. Also, a suitable quantity of sugar may be added to control the "dryness" or "sweetness" of the final beverage. These ingredients, and particularly the alcohol and lemon, combined in the specified proportions, unexpectedly result in a most suitable lemon-alcohol concentrate, needing no chemical or preservatives, which does not spoil over extended time periods.

Concentrate compositions according to the invention may be prepared by adding the desired quantity of lemon, either as fresh lemon peels or oil of lemon (*oleum limonis*) to alcohol of 200-proof concentration. These ingredients are permitted to stand at ambient temperature for a period sufficient to "saturate" the alcohol with the lemon. I have also found that, to attain a beverage having the most desirable flavor, aroma, and color, witout the addition of artificial ingredients, fresh yellow lemon peels, thinly sliced, or fresh lemon oil extracted from such lemon peels, should be used. The use of any other ingredient to impart the fresh lemon flavor will adversely affect the characteristics of the concentrate, and ultimately the beverage.

In essence, the alcohol and lemon, in the quantities I have determined, form a "cold solution" which is most stable and will not spoil. Moreover, the stablity of this concentrated solution is not affected in preparing the final beverage by adding pure water, sugar, and any other suitable material ingredients which would not, in themselves, affect the desired properties of the concentrate. For making the beverage itself, sugar is added to impart the desired "dryness" or "sweetness." Water is added to achieve the desired alcohol concentration, or proof. It has been found, however, that, if a beverage having a proof less than approximately 20–25, its resistance to spoiling is severely affected.

The alcohol, water, and sugar ingredients used in preparing the compositions of the present invention may be of various types, all well-known within the skill of the art. Again, the key feature of this invention, and that which permits the achievement of a beverage having a natural fresh lemon flavor and a satisfactorily long shelf life, is the special combination of proportions in which these ingredients, particularly the alcohol and lemon, are combined. Basically, I have found that, to prepare a beverage having from about 20–25 to 200 proof, about 5–60 grams of lemon peel must be used for each liter of 200-proof alcohol. It will be seen that, where larger quantities of water (lower proof) and sugar (increased sweetness) will be added, the amount of lemon in the concentrate must be controlled to achieve the desired flavor. It is also well-known, of course, that sugar and water affect the dryness and alcoholic proof of the beverage, and these factors may be controlled in a known way to achieve the desired characteristics of the final product.

The following examples are provided merely to illustrate the preferred embodiments of the invention and are not intended to limit its scope in any way.

EXAMPLE 1

A suitable concentrate, according to the present invention, was prepared as follows:

| | |
|---|---|
| alcohol (200 proof) | .95 liter |
| fresh yellow lemon peels (from two fresh lemons) | 20 grams |

EXAMPLE 2

Using the concentrate according to Example 1, a 75-proof liquor beverge was prepared by adding 0.95 liter (one quart) pure water and 931.6 grams (2pounds, 4 ounces) of white, granulated sugar. It was found that this beverage did not spoil over a period in excess of five years, even though the bottle's contents were intermittently exposed to air.

The ingredients in Example 2 fall within the range of the proportions for the constituents of the composition according to the invention. While this composition has been found to be a most desirable sweet liqueur, any number of compositions can be prepared by varying the proportions affecting alcoholic content, or proof, and the dryness of the beverage.

EXAMPLE 3

The 75-proof lemon liqueur, according to Example 2, was pepared by peeling, very thinly, two fresh yellow lemons to obtain 20 grams of fresh lemon peels. These lemon peels were added to 0.95 liter of 200-proof alcohol, and the mixture was permitted to stand for approximately 24 hours at ambient temperature, after which the fresh lemon peels had saturated into the alcohol and an alcohol-lemon concentrate was obtained. The 931.6 grams of white, granulated sugar were then dissolved in 0.95 liter of hot water, which was stirred thoroughly, to obtain a hot sugar solution, The hot sugar solution was thereafter cooled and added to the alcohol-lemon concentrate with stirring.

While this invention has been described with respect to the specific illustrative embodiments of the compositions and method, it will be apparent to those skilled in the art that the principles of this invention encompass many other embodiments as defined by the scope of the appended claims.

I claim:
1. A method for preparing a stable, alcoholic composition having a fresh lemon flavor which comprises (1) adding from about 0.5% to 10% fresh lemon peel to 200 proof ethyl alcohol; (2) permitting this mixture to stand at ambient temperature for approximately 24 hours; and (3) thereafter adding sugar to control sweetness and water to control the proof of the composition.

* * * * *